(12) United States Patent
Tachikura et al.

(10) Patent No.: US 8,915,100 B2
(45) Date of Patent: *Dec. 23, 2014

(54) OPTICAL FIBER END PROCESSING METHOD AND OPTICAL FIBER END PROCESSING APPARATUS

(75) Inventors: Masao Tachikura, Hitachi (JP); Yoshiyuki Hiramoto, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 203 days.

This patent is subject to a terminal disclaimer.

(21) Appl. No.: 13/245,386

(22) Filed: Sep. 26, 2011

(65) Prior Publication Data

US 2012/0073330 A1    Mar. 29, 2012

(30) Foreign Application Priority Data

Sep. 29, 2010  (JP) ................. 2010-218026

(51) Int. Cl.
  *C03B 37/01* (2006.01)
  *G02B 6/25* (2006.01)
  *G02B 6/02* (2006.01)

(52) U.S. Cl.
  CPC .............. *G02B 6/25* (2013.01); *G02B 6/02366* (2013.01); *G02B 6/02376* (2013.01)
  USPC .............................................. 65/433; 65/384

(58) Field of Classification Search
  USPC ........... 65/488, 501, 507, 384, 410, 433, 452; 385/123, 125
  See application file for complete search history.

(56) References Cited

U.S. PATENT DOCUMENTS

| 5,321,790 A * | 6/1994 | Takahashi et al. ............ 385/140 |
| 6,868,213 B2 | 3/2005 | Sasaoka et al. |
| 2002/0159734 A1 | 10/2002 | Sasaoka et al. |
| 2006/0062533 A1 | 3/2006 | Hachiwaka et al. |

FOREIGN PATENT DOCUMENTS

| JP | 2002323625 A | 11/2002 |
| JP | 2004004320 A | 1/2004 |
| JP | 2005024849 A | 1/2005 |

OTHER PUBLICATIONS

Machine translation of JP 2005024849, Optical Fiber Connector, Kurosawa et al., Jan. 27, 2005.*

(Continued)

*Primary Examiner* — Queenie Dehghan
(74) *Attorney, Agent, or Firm* — Paul D. Bianco; Martin Fleit; Fleit Gibbons Gutman Bongini & Bianco PL

(57) ABSTRACT

An optical fiber end processing method includes the steps of: an optical fiber fixing step of fixing two parts of the optical fiber; a first heating step of heating a tip end side part of the optical fiber between two fixed parts fixed in the optical fiber fixing step, and melting the optical fiber of the tip end side heating part; a second heating step of heating a part on a base end side of the optical fiber between the fixed parts away from the tip end side heating part in a state that two parts of the optical fiber are fixed, and making the holes of the optical fiber disappear; and a removing step of removing the tip end side heating part after the second heating step.

4 Claims, 4 Drawing Sheets

(56) References Cited

OTHER PUBLICATIONS

Masao Tachikura, Fusion mass-splicing for optical fibers using electric discharges between two pairs of electrodes, Applied Optics, vol. 23, No. 3, pp. 492-498 (Feb. 1984).

Masao Tachikura and Norio Kashima, Fusion mass-splices for optical fibers using high-frequency discharge, IEEE/OSA Journal of Lightwave Technologh, vol. LT-2, No. 1, pp. 25-31 (Feb. 1984).

* cited by examiner

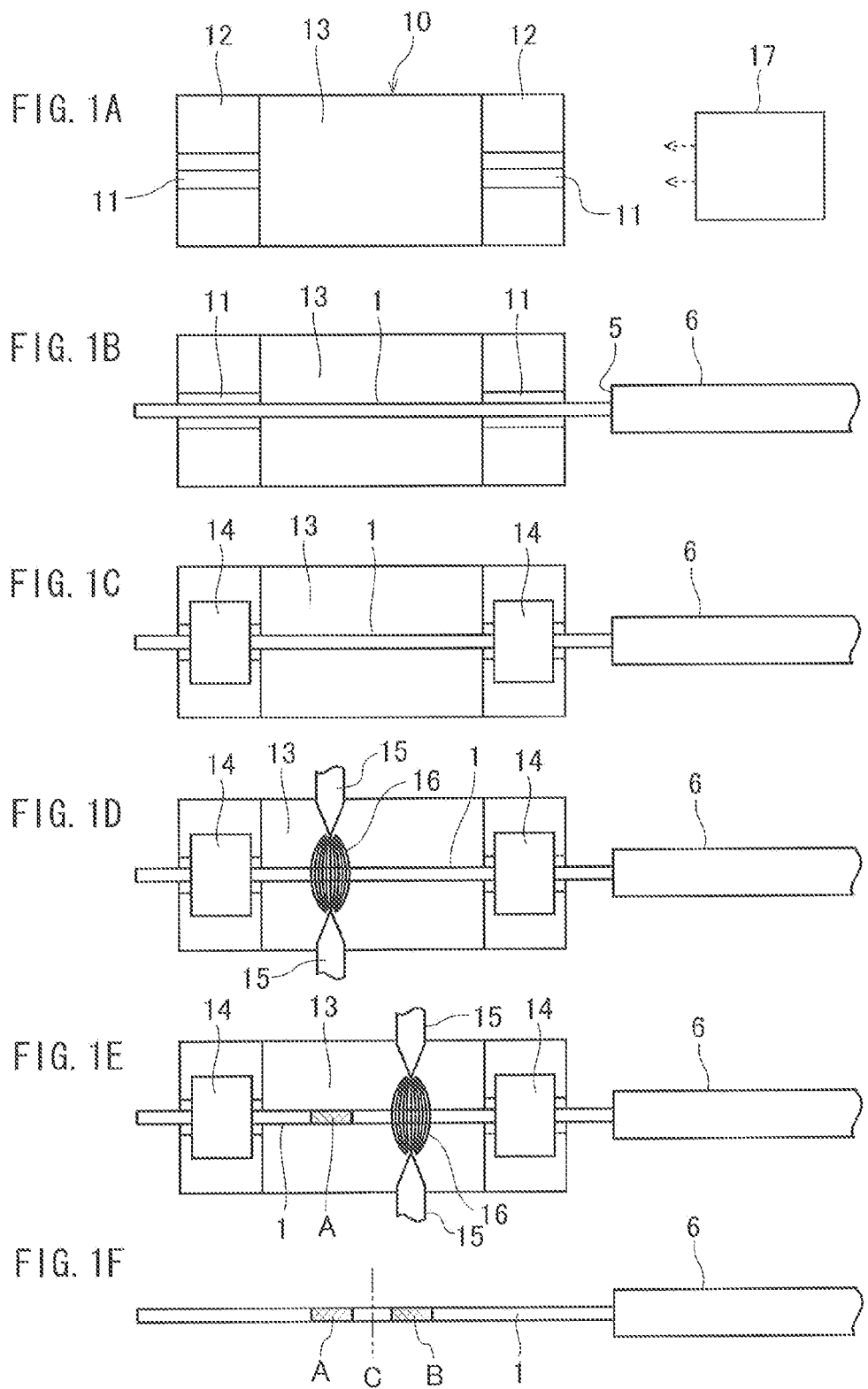

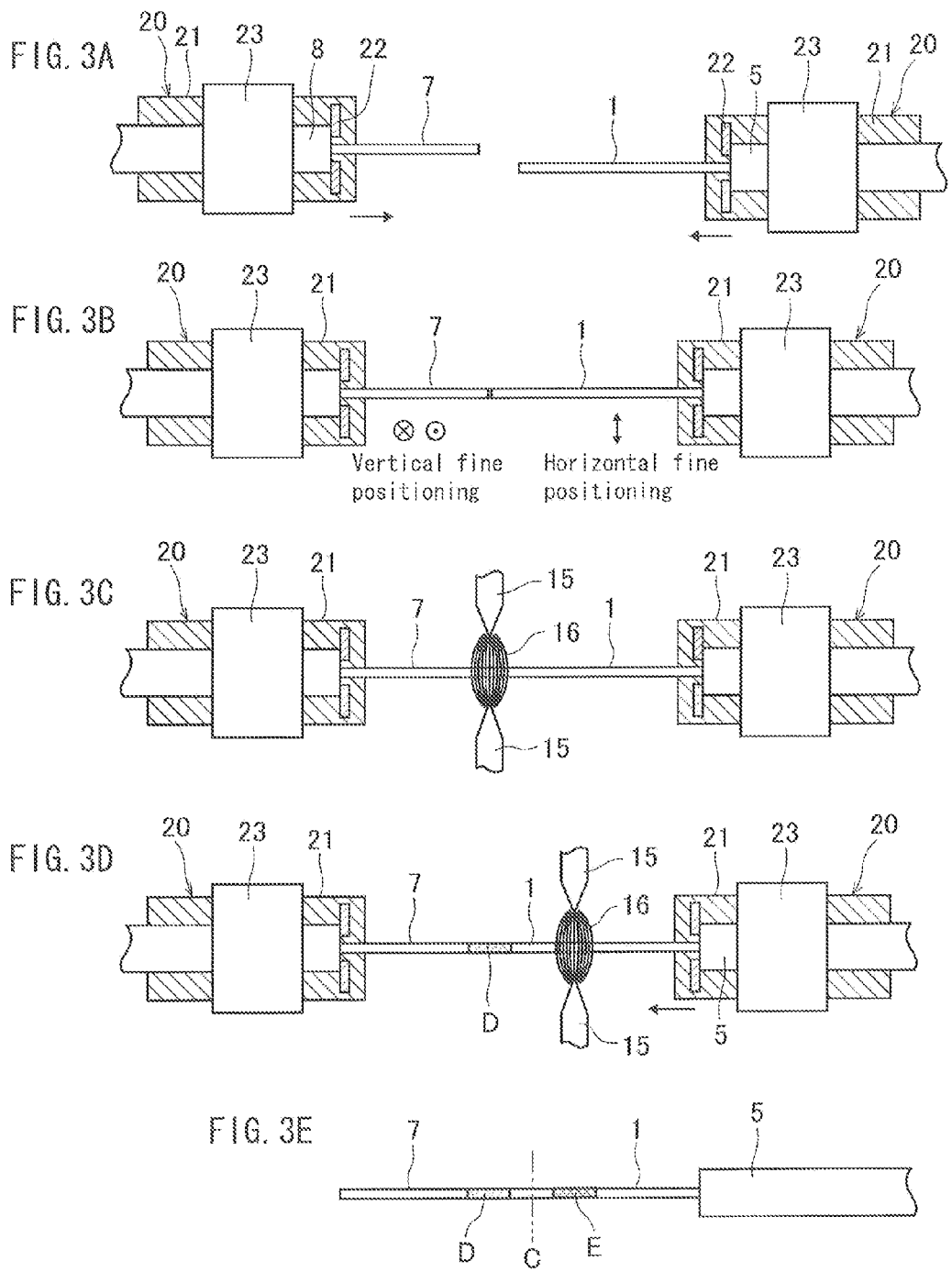

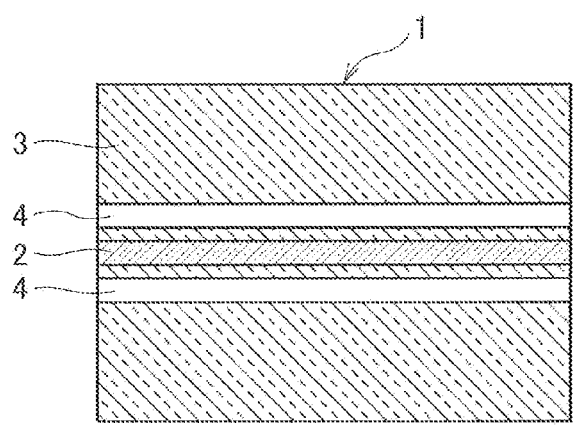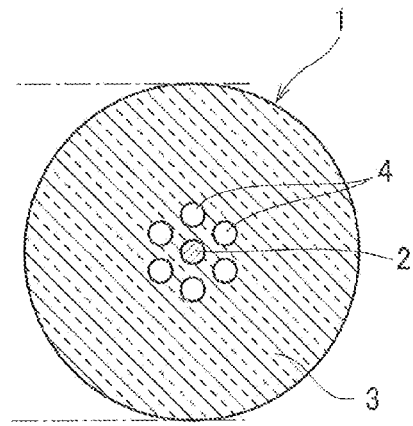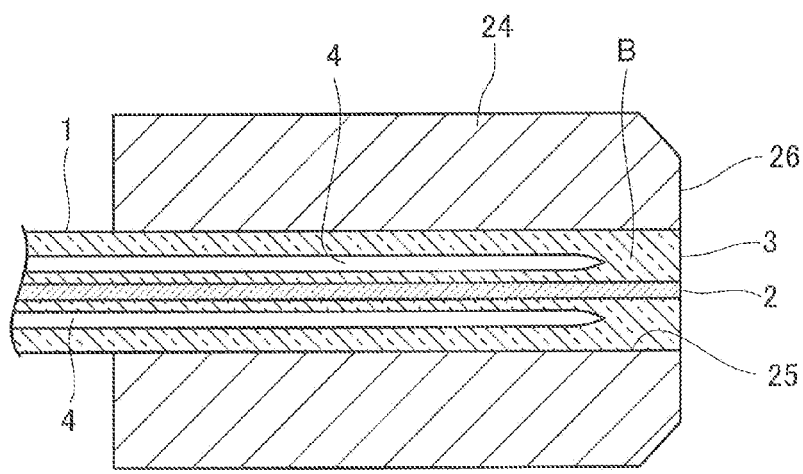

US 8,915,100 B2

OPTICAL FIBER END PROCESSING METHOD AND OPTICAL FIBER END PROCESSING APPARATUS

The present application is based on Japanese Patent Application No. 2010-218026, filed on Sep. 29, 2010, the entire contents of which are hereby incorporated by reference.

BACKGROUND OF THE INVENTION

1. Technical Field

The present invention relates to an optical fiber end processing method and an optical fiber end processing apparatus for processing an end of an optical fiber having a plurality of holes around a core part.

2. Description of the Related Art

In recent years, a new optical fiber is focused, which is called a holey fiber or a photonic crystal fiber having a plurality of holes around a core part, and a broad application of the new optical fiber to an optical code for communication and an optical device, etc., is examined (for example, see patent document 1).

FIG. 4 shows a structure of a typical holey fiber. As shown in FIG. 4, a holey fiber 1 is composed of a core part 2; a clad part 3 formed on an outer periphery of the core part 2; and a plurality of holes 4 formed along an axial direction of the core part 2 around the core part 2 of the clad part 3.

When the holes 4 formed on the clad part 3 are opened on an end face of the holey fiber 1, moisture enters into the holes 4 or condensation occurs inside the holes due to temperature variation, thus reducing a mechanical strength of the holey fiber 1 or generating a fluctuation of optical characteristics in some cases.

Further, when optical fibers are connected to each other, using a connecting member such as a mechanical splice or a MT connector, etc., a method of reducing a reflection on a connection end face and a connection loss by filling an interspace between a connection end face of one of the optical fibers and a connection end face of the other optical fiber, with a liquid refractive index matching material. When this connection method is applied to the holey fiber 1 as shown in FIG. 4, and when the holes 4 are opened on the end face of the holey fiber 1, the liquid refractive index matching material enters into the holes 4 from the connection end face. Thus, there is a problem that the refractive index matching material on the connection end face is run out, resulting in causing a large reflection or connection loss.

Further, in a single-core optical connector which requires no refractive index matching material, there is a problem that when the connection end face of the holey fiber 1 is polished, an abrasive or a polishing debris that enters into the holes 4 goes outside after polishing and is caught by the connection end face, thus damaging the fiber end face or deteriorating the optical characteristics due to an interspace generated in this part.

In order to cope with this problem, conventionally the following technique is proposed.

Patent document 1 describes a method for closing pores (holes) of a photonic crystal fiber end, by a closing material with lower refractive index than that of the core part.

Patent document 2 describes a method for collapsing hollow parts (holes) of the optical fiber by heating the optical fiber end and softening the clad part, or a method for sealing the hollow parts by filling the hollow parts with resin, as a method for sealing the hollow parts (holes) of the optical fiber.

Patent document 3 describes a method for melting and closing the holes by arc discharge applied to a position away from the end face of the optical fiber.

Patent Document 1:
Japanese Patent Laid Open Publication No. 2004-4320
Patent Document 2:
Japanese Patent Laid Open Publication No. 2002-323625
Patent Document 3:
Japanese Patent Laid Open Publication No. 2005-24849
Non-Patent Document 1:
"Development trend of Photonic crystal fiber and holey fiber" by Hasegawa, Monthly magazine: "Optronics", No. 7, pp. 203-208 (2001), issued by Optronics Inc.

The method for sealing the holes by melting the optical fiber itself having the holes by heating described in the patent document 2, has an advantage that there is no problem of aging deterioration, because moisture, etc., is completely prevented from entering into the holes, compared with the method for sealing the holes using the closing material made of resin described in patent document 1. However, the method for melting the end of the optical fiber has a problem that a shape of a core is disturbed and optical loss is easily generated; when a cantilever optical fiber end is heated, a heated portion is bent or expanded due to unbalance of surface tension in a peripheral direction of the optical fiber in a molten state, thus making it difficult to obtain a desirable shape; and the optical fiber end is expanded and is hardly enter into a hole of a ferrule for connector.

Further, according to patent document 3, it is important that two parts of the optical fiber end are respectively fixed to V-grooves, thus enhancing positional accuracy between two V-grooves and suppressing axial shift or angular deviation of the optical fiber between V-grooves as much as possible, so that the bending of the closing part of the holes due to heating and melting is suppressed to be small. However, even if the positional accuracy is enhanced between two V-grooves, there is a problem as follows. Although the optical fiber is placed on the V-groove after coating is removed, there is a possibility that a minute coating refuse remains on a surface of the optical fiber. Then, such a coating refuse adheres to the V-groove portion or a V-groove presser, and the positional accuracy of the optical fiber by a V-groove component is deteriorated, thereby generating deformation and bending of the hole closing part of the optical fiber. Further, not only the coating refuse but also dust floating in the air, and fibers of a cotton-swab for cleaning can also have an adverse influence. In addition, slight deformation and bending are generated in the hole closing part of the optical fiber when being heated and melted, due to incompleteness of the accuracy of the V-groove itself and the V-groove presser, thus inevitably generating a variation in the loss of the optical fiber.

Note that as the method for sealing the holes of the holey fiber, it can be considered that a general optical fiber is fusion-spliced to the connection end face of the holey fiber. However, in this method, the axial shift or angular deviation, and expansion are easily generated in a fusion-spliced part. When such axial shift, angular deviation and expansion are generated, it is difficult to fit the holey fiber into the ferrule, and a surface of the holey fiber is easily damaged during the fitting work, thus posing a problem in workability and reliability. Further, loss in a fusion-spliced part between the holy fiber and the optical fiber is easily excessively generated, if compared with the method for heating and melting the optical fiber between V-grooves described in the patent document 3.

BRIEF SUMMARY OF THE INVENTION

An object of the present invention is to provide an optical fiber end processing method and an optical fiber end processing apparatus, capable of largely reducing an increase of a loss due to incompleteness of positioning of an optical fiber.

According to an aspect of the present invention, there is provided an optical fiber end processing method, for processing an end of an optical fiber comprising a core part; a clad part surrounding an outer periphery of the core part; and a plurality of holes formed along an axial direction of the core part around the core part in the clad part, the optical fiber end processing method comprising:

an optical fiber fixing step of fixing two parts of the optical fiber;

a first heating step of heating a tip end side part of the optical fiber between two fixed parts fixed in the optical fiber fixing step, and melting the optical fiber of the tip end side heating part, after the optical fiber fixing step;

a second heating step of heating a part on a base end side of the optical fiber between the two fixed parts away from the tip end side heating part in a state that the two fixed parts of the optical fiber are fixed, and making the holes of the optical fiber disappear, after the first heating step; and a removing step of removing the tip end side heating part after the second heating step.

As an optical fiber end processing apparatus that executes the optical fiber end processing method, it is preferable to use an optical fiber end processing apparatus comprising:

a fiber fixing unit that fixes two parts of the optical fiber;
a heating unit that heats the optical fiber; and
a control unit that controls a heating operation by the heating unit for heating a different part of the optical fiber between the fixed parts at two parts fixed by the fiber fixing unit.

According to other aspect of the present invention, there is provided an optical fiber end processing method, for processing an end of an optical fiber comprising a core part; a clad part surrounding an outer periphery of the core part; and a plurality of holes formed along an axial direction of the core part around the core part in the clad part, the optical fiber end processing method comprising:

a fiber fixing step of fixing the optical fiber and a supporting fiber in a state that each end face is opposed to each other;

a first heating step of heating the optical fiber and the supporting fiber, and fusion-splicing the optical fiber and the supporting fiber, after the fiber fixing step;

a second heating step of heating a part of the optical fiber positioned between a fixed part of the optical fiber and the fusion-spliced part, away from the fusion-spliced part, in a state that the optical fiber and the supporting fiber are fixed, and making the holes of the optical fiber disappear, after the first heating step; and a removing step of removing the fusion-spliced part after the second heating step.

As an optical fiber end processing apparatus that executes the optical fiber end processing method, it is preferable to use an optical fiber end processing apparatus comprising:

a fiber fixing unit that fixes the optical fiber and the supporting fiber respectively;

a heating unit that heats the optical fiber and the supporting fiber; and a control unit that controls a heating operation by the heating unit for heating a different part of the optical fiber and the supporting fiber fixed by the fiber fixing unit.

BRIEF DESCRIPTION OF THE DRAWINGS

FIG. 1A to FIG. 1F are planar views showing processing steps of an optical fiber end processing method according to a first embodiment of the present invention.

FIG. 3A to FIG. 3E are cross-sectional views showing each processing step of the optical fiber end processing method according to a second embodiment of the present invention.

FIG. 4A is a vertical cross-sectional view showing a structure of a holey fiber used in an embodiment of the present invention.

FIG. 4B is a horizontal cross-sectional view of the holey fiber of FIG. 4A.

FIG. 5 is a vertical cross-sectional view showing a holey fiber end with a ferrule fitted thereinto which is manufactured by the optical fiber end processing method according to an embodiment of the present invention.

DETAILED DESCRIPTION OF THE INVENTION

Figure 2A:
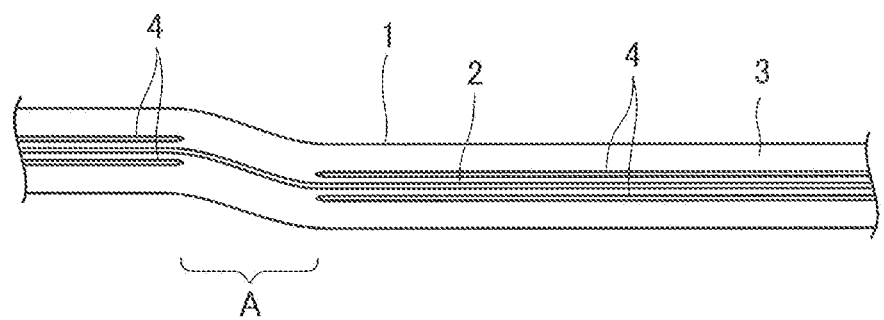
FIG. 2A and FIG. 2B are explanatory views for describing a processing principle in the optical fiber end processing method according to a first embodiment of the present invention.

An embodiment of an optical fiber end processing method and an optical fiber end processing apparatus according to the present invention will be described hereafter.

First Embodiment

FIG. 4A, FIG. 4B show a holey fiber used in the optical fiber end processing method according to a first embodiment. FIG. 4A is a vertical cross-sectional view, and FIG. 4B is a horizontal cross-sectional view. A holey fiber 1 shown in FIG. 4A and FIG. 4B is composed of a core part 2; a clad part 3 formed on an outer periphery of the core part 2; and a plurality of holes 4 formed along an axial direction of the core part 2 in the clad part 3. In the hole fiber 1 of this embodiment, as shown in FIG. 4B, six holes 4 are provided respectively at vertices of a regular hexagonal shape with the core part 2 as a center. Further, the holey fiber 1 of this embodiment is made of a silica-based material, and for example germanium is added to the core part 2, and a refractive index of the core part 2 is higher than a refractive index of the clad part 3. An outer peripheral part of the holey fiber 1 is usually protected by resin coating such as ultraviolet curing resin, and when being fitted to a connector, etc., the holey fiber 1 in a bare state peeled off from coating is used.

Note that the optical fiber of the present invention may be the optical fiber having a plurality of holes formed along the axial direction of the core part around the core part, and a holey fiber and a photonic crystal fiber, etc., correspond thereto. The optical fiber (holey fiber) having a hole structure of FIG. 4 has a higher refractive index in the core part than the refractive index in the clad part. However, in the optical fiber of the present invention, the core part and the clad part are made of the same material, and the optical fiber with the clad part having a structure that holes are regularly arranged around the core part, is also acceptable. The optical fiber with this structure is frequently called a photonic crystal fiber, wherein lots of (usually several dozen) holes are arranged in Honeycomb grid type, thus forming a photonic crystal structure or a photonic bandgap structure.

FIG. 1A to FIG. 1F show each step of the optical fiber end processing method according to a first embodiment of the present invention, and is a planar view showing the processing of an optical fiber end using the optical fiber end processing apparatus viewed from above.

FIG. 1A shows a V-groove component 10 for fixing an end of the holey fiber 1. V-groove stage 12, being fixing parts, having V-grooves 11 for placing the holey fiber 1 thereon are formed at both ends of the V-groove component 10. An interspace (hollow part) 13 is formed between the V-groove stages 12, 12 for performing a heating work of the holey fiber 1. The V-groove component 10 with this structure is equivalent to a V-groove component of integrated precision machining having an interspace in the center, which is used for a commercially available optical fiber fusion splicer. V-grooves 11, 11 at both ends of the V-groove component 10 are precisely machined so as not to occur positional deviation from each other, and when the optical fiber is placed on the V-grooves at both sides respectively and fixed thereto, two axes of the optical fibers are aligned with each other. Note that the fusion splicer of recent years, has a V-groove component having a plurality of V-grooves formed therein so that a multicore fiber tape can also be connected, and such a V-groove component having a plurality of V-grooves may also be used. The optical fiber end processing apparatus has a discharge electrode, being a heating unit that heats the holey fiber 1, and as shown in FIG. 1A, has a control unit 17 that controls a discharge heating operation by the discharge electrode. Note that in FIG. 1B to FIG. 1F, the control unit 17 is not shown.

Similarly to other optical fiber, the holey fiber is used in a state that resin coating is applied thereto. However, the coating needs to be removed in a case of a fiber connection or an optical component connection. When the holes 4 of the holey fiber 1 are closed and sealed, first, a resin coating 5 of a resin coated holey fiber 6 is removed to obtain the holey fiber 1 in a bare state, and as shown in FIG. 1B, two parts of the end of the holey fiber 1 are set on the V-grooves 11 at both sides across the interspace 13. Note that the resin coated holey fiber 6 is also fixed to a support so as not to be moved, although not shown.

Next, as shown in FIG. 1C, the holey fiber 1 is supported and fixed to the V-grooves 11, 11 at both sides by a V-groove presser 14, so as to be firmly fitted thereinto. When the holey fiber 1 of the interspace 13 between the V-grooves 11, 11 is heated and melted, the holey fiber 1 in a molten state shrinks by surface tension, and therefore the holey fiber 1 needs to be firmly fixed by the V-groove presser 14, against such a shrinkage.

Next, the holey fiber 1 between the V-grooves 11, 11 is melted by electric discharge heating. The electric discharge heating is performed by arranging a pair of discharge electrodes 15, 15 in the interspace 13 for example. A discharge plasma region 16 is formed between the discharge electrodes 15, 15, and the holey fiber 1 in the discharge plasma region 16 is heated. A discharge circuit equivalent to that of a commercially available fusion splicer may be connected.

First, as shown in FIG. 1D, first discharge heating is performed so that a tip end side part of the holey fiber 1 in the holey fiber 1 between the V-grooves 11, 11 is heated, to thereby melt the holey fiber 1 in this heated part in a deformable state.

At this time, if rubbish or dust generated in the resin coating 5, etc., removed from the resin coated holey fiber 6, adheres to the V-groove 11 or the V-groove presser 14, the holey fiber 1 is grasped by the V-grooves stages 12, 12 at both sides of the holey fiber 1 in a state that the axial shift and angular deviation are generated, and therefore a stress is generated in the holey fiber 1 (further, the axial shift and the angular deviation are also generated due to incompleteness of the accuracy of the V-groove itself of the V-groove stage 12 and the V-groove presser 14 in some cases). Therefore, the heating and melting part of the holey fiber 1 by discharge heating is deformed so that the stress of a non-melting part is relaxed. After sufficient heating and relaxing the stress, electric discharge is stopped.

Figure 2B:
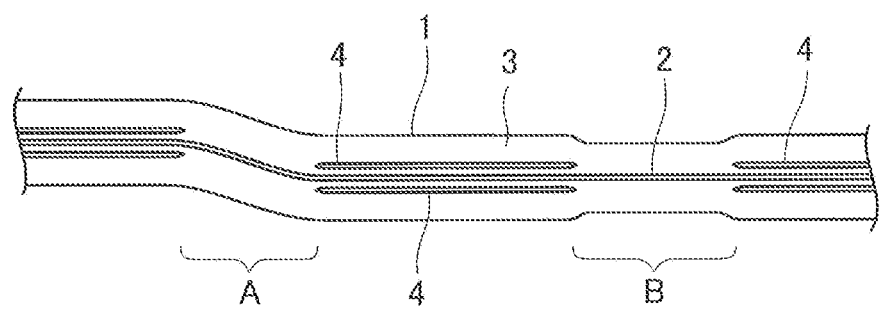

Such a deformation of the heating and melting part will be further described, using an explanatory view of a processing principle of FIG. 2A and FIG. 2B. FIG. 2A, FIG. 2B schematically show the axial shift on the assumption that the axial shift occurs in grasping the holey fiber 1 by the V-grooves 12, 12 at both sides of the holey fiber 1. FIG. 2A shows a state after executing a first discharge heating. Deformation occurs in a first heating and melting zone A, being a tip end side heating part of the holey fiber 1. As a result of melting the first heating and melting zone A by discharge heating, deformation of axial shift occurs in this part, and the stress in the holey fiber 1 grasped in a state of axial shift, is relaxed. Therefore, when the electric discharge is ended, the stress added to the holey fiber 1 between the V-grooves 12, 12, is relaxed over the whole body of the hole fiber 1. Owing to this stress relaxation, the hole fiber 1 is set in a straight and stress-free state at the base end side (right side in FIG. 2) of the first heating and melting zone A.

Next, as shown in FIG. 1E, the discharging electrode 15 is shifted to the right side (base end side of the holey fiber 1), and the electric discharge is carried out again. In the second electric discharge, the a base end side part of the holey fiber 1 is heated, which is a part away from the first heating and melting zone A so that the first heating and melting zone A is not melted again, positioned between the V-grooves 11, 11. In the heated and melted holey fiber 1, the holes 4 formed inside become naturally smaller and disappear due to the surface tension of molten glass. Thus, a closed part or a sealed part is formed, with disappearance of the holes, which is an original purpose of the present invention.

In a first heating and melting zone A, being a first heating part, large deformation occurs when a fiber fixing state is poor due to the axial shift between fixing parts of the hole fiber 1, and a large loss is generated when light is passed therethrough. Meanwhile, in a second heating and melting zone B, being a second heating part, the holey fiber 1 is straight and the stress is not generated, and therefore almost no deformation such as bending occurs even if the holey fiber 1 is heated and melted, excluding disappearance of the holes 4 of the holey fiber 1 and reduction of a diameter of the holey fiber 1.

FIG. 2B shows a state after executing the second discharge heating. Since the holey fiber 1 is melted in a state that the stress is not added thereto, only the surface tension is added to the holey fiber 1, and in the second heating and melting zone B, the deformation of slightly reducing an outer diameter occurs, with disappearance of the holes 4. Accordingly, straightness of the core part 2 of the holey fiber 1 is maintained, and therefore increase of the loss in the second heating and melting zone B is small when the light is propagated.

In addition, electric discharge heating can be automatically executed by providing a control unit 17 that controls an electric discharge heating operation for heating a different part of the optical fiber 1 between the V-grooves 11 and 11 at two places fixed by the V-groove component 10, by electric discharging electrodes 15, 15, and by setting an operation program in the control unit 17 for continuously executing the electric discharge heating operation twice as described above.

Next, as shown in FIG. 1F, in order to remove the deformed first heating and melting zone A, the holey fiber 1 is cut at a cut position C, for example, at a position between the first heating and melting zone A and the second heating and melting zone B, at a right side (base end side of the holey fiber 1) of the first heating and melting zone A. As a result of the disappearance of the holes 4, the outer diameter becomes small in the first heating and melting zone A and the second heating and melting zone B, and a reflection state to light from outside is changed. Therefore the cut position C can be confirmed visually, and therefore the cut position C can be easily identified.

When the holey fiber 1 is fitted into the ferrule of the connector, a discharge position is set so that a length from a coating edge of the resin coating 5 of the resin coated holey fiber 6, to the second heating and melting zone B is set to a defined value. The reason why the first heating and melting zone A is removed, is that if the deformed first heating and melting zone A exists, the holey fiber 1 cannot be inserted into a fiber guide hole in the ferrule.

FIG. 5 shows an embodiment of the optical fiber end processing method for fitting a ferrule 24 into the end of the holey fiber 1. The holey fiber 1 after the aforementioned end processing having the second heating and melting zone B, is inserted into a fiber guide hole 25 of the ferrule 24 and is adhered and fixed thereto, and thereafter a ferrule end face 26 is polished. The second heating and melting zone B, being a hole disappearance region where the holes 4 of the end of the holey fiber 1 disappear, is positioned on the ferrule end face 26 after polishing. Note that the ferrule 24 of FIG. 5 has a portion for holding the resin coated holey fiber 6, although not shown.

In a mechanical splice and the connector attached on-site with the mechanical splice incorporated therein, the second heating and melting zone B of the holey fiber 1 is preferably set as a connection end face. Therefore, when the holey fiber 1 is applied to the mechanical splice and the connector of site attachment with the mechanical splice incorporated therein, the holey fiber 1 is preferably cut at a position of the second heating and melting zone B where the holes 4 disappear. However, there is no inconvenience particularly in cutting the holey fiber 1 at a position between the first heating and melting zone A and the second heating and melting zone B, while the holes 4 remain on the connection end face of the holey fiber 1. In a case of a liquid matching agent, the air enclosed in the holes 4 comes out on the connection end face at a high temperature, thereby involving a problem that an adverse influence is given thereto. However, such an adverse influence can be prevented by applying the matching agent to the end face of the holey fiber 1 and excluding the air in the holes 4 by heating with warm air, as pre-processing of the connection.

Note that in the second discharge heating shown in FIG. 1E according to the aforementioned embodiment, diameter reduction of the second heating and melting zone B generated by the disappearance of the holes due to surface tension, may be prevented or reduced by pushing (compressing) the holey fiber 1 in a direction of shortening the length of the holey fiber 1. Specifically, for example, in the tip end side V-groove stage 12 of the holey fiber 1, the tip end side V-groove presser 14 is set to be effective loosely so that the tip end of the holey fiber 1 can slide in an axial direction in the V-groove 11, and the base end side V-groove presser 14 is set to be effective sufficiently. Then, the tip end portion of the holey fiber 1 is slightly moved in a right direction (base end side direction of the holey fiber 1) by a fine moving mechanism which is provided separately, to thereby prevent or reduce diameter reduction of the second heating and melting zone B.

The fine moving mechanism is a mechanism capable of sliding the optical fiber between the V-grooves without axial shift, and is employed by all commercially available fusion splicers for an optical fiber ribbon, and almost all non-alignment type fusion splicers for a single optical fiber, which is an existent technique.

Further, in the aforementioned embodiment, preferably the first heating and melting zone A and the second heating and melting zone B are not overlapped on each other. This is because since the first heating and melting zone A is deformed in a certain length range, when a part of the second heating and melting zone B is overlapped thereon, the second heating and melting zone B is slightly affected by the deformation of the first heating and melting zone A at a second melting time. Further, instead of changing the position of the discharge electrodes 15, 15, independent discharge electrodes are disposed at each position, and the electric discharge may be caused as needed by switching the electrodes.

Further, when the discharge heating is performed by using a normal fusion splicer, the holes 4 can be closed or sealed by a length of about 0.5 mm. Longer length of the closing part may sometimes contribute to improving a yield rate in a connectorizing work. In order to increase the length of the closing part in the aforementioned embodiment, for example, the discharge electrode 15, 15 may be moved in a right direction of FIG. 1E (base end side direction of the holey fiber 1) while continuing the electric discharge at a second charging time for example. Alternately, second electric discharge is started from a position with a margin in a distance from this position to the first heating and melting zone A, and the discharge electrodes 15, 15 may be moved in a left direction (tip end side direction of the optical fiber 1) while continuing the electric discharge. Alternately, the discharge electrodes 15, 15 are reciprocated in a prescribed range, and the holes 4 may be gradually disappeared.

Note that if the discharge heating is continued while moving the discharge electrodes, and the electric discharge is weakened in a middle, to stop a melting operation, such a discharge heating is substantially equivalent to the discharge heating performed twice.

Further, the discharge plasma region 16 may be expanded and heated without moving the discharge electrodes 15, 15. In this case, it is effective to expand an interval between a pair of discharge electrodes 15, 15, and shift the discharge electrodes 15, 15 in a vertical direction to a paper face of FIG. 1E for example. When the discharge electrodes 15, 15 are shifted in the vertical direction, the holey fiber 1 is heated from one side thereof by a pair of discharge electrodes 15, 15, and therefore it is also effective for stabilization to simultaneously heat the holey fiber 1 from both sides thereof by disposing a pair of discharge electrodes on one side, thus by two pairs of discharging electrodes.

Note that non-patent document 2 published by the Optical Society of America (OSA) describes the fusion splicing technique using two pairs of discharging electrodes. Further, explanation is given heretofore on the assumption that the single optical fiber is processed. However, regarding a fiber ribbon obtained by making a plurality of holey fiber into a ribbon, the aforementioned processing can be executed by completely the same method only by increasing the number of V-grooves. At this time, all holey fibers need to be uniformly heated, and this is a publicly-known technique already realized by the fusion splicer. Regarding the fiber ribbon, the method using two pairs of discharging electrode is described in non-patent document 2, and a method of using a pair of discharge electrode is described in non-patent document 3.

Non-Patent Document 2:
M. Tachikura: "Fusion mass-splicing for optical fibers using electric discharges between two pairs of electrodes", Applied Optics, Vol. 23, No. 3, pp. 492-498 (February 1984).

Non-Patent Document 3:
M. Tachikura and N. Kashima: "Fusion mass-splices for optical fibers using high-frequency discharge", IEEE/OSA Journal of Lightwave Technologh, Vol. LT-2, No. 1, pp. 25-31 (February 1984).

Second Embodiment

According to a second embodiment of the present invention, the holey fiber end processing is performed, using the supporting fiber other than the holey fiber.

FIG. 3A to FIG. 3E show each step of the optical fiber end processing method according to the second embodiment of the present invention, and cross-sectional views showing the vicinity of the optical fiber end processing, using the optical fiber end processing apparatus.

First, as shown in FIG. 3A, the holey fiber 1, being a processing object, and the silica-based supporting fiber 7 are attached to the optical fiber end processing apparatus. In this embodiment, a commercially-available fusion splicer with aligning function is used as the optical fiber end processing apparatus. The supporting fiber 7 is attached to the fusion splicer after removing the fiber ribbon coating 8 of the end portion. The supporting fiber 7 is used for mechanically supporting the holey fiber 1 when it is heated and melted, after being fusion-spliced to the holey fiber 1, and there is no particular requirement for the optical characteristics. Accordingly, any kind of fiber may be acceptable as the supporting fiber 7, and for example, a silica glass rod (silica glass wire) without core may also be used.

Although the fusion splicer has a system in which the resin coating part is directly attached to the fine moving base, explanation is given here for a case that the resin coating part is attached to the fiber holders 20, 20 of the fusion splicer, and thereafter is attached to the fine moving base. The resin coating part 5 of the holey fiber 1 and the resin coating part 8 of the supporting fiber 7 are respectively attached to the fiber holder 20. A fiber stopper 22 is formed in the fiber holder body 21 of the fiber holder 20, and positioning of the coating edge is performed by making the coating edge of the fiber ribbon coating parts 5, 8 brought into contact with the fiber stopper 22. Designation mark 23 indicates a fiber clamp for pressing the resin coating parts 5, 8 to the fiber holder 20. In a state immediately after attaching both fibers 1, 7 to the fiber holder 20, as shown in FIG. 3A, axes of the fibers 1, 7 are largely shifted from each other. Therefore, first, the end face of both fibers 1, 7 are approached to each other based on camera picture data, as the pre-processing of aligning axes.

FIG. 3B shows the next axes aligning state. The axes are automatically aligned based on the camera picture data, with outlines of the fibers 1, 7 as references. In FIG. 3B, the holey fiber 1 attached to the right side fiber holder 20 is horizontally slightly moved in an axially vertical direction of the holey fiber 1 in parallel to the paper face, and the supporting fiber 7 attached to the left side fiber holder 20 is vertically slightly moved in a vertical direction to the paper face, to thereby align the axes.

Thereafter, as shown in FIG. 3C, the supporting fiber 7 is fusion-spliced to the holey fiber 1. Similarly to the first embodiment, for example, a pair of discharge electrodes 15 are used, to thereby heat and melt the holey fiber 1 and the supporting fiber 7 in the discharge plasma region 16 formed between the discharge electrodes 15, 15. A detailed adjustment of conditions is not required at the time of fusion splicing, because an optical performance of the heated and melted fusion-spliced part is not important. The electric discharge may be continued until a flow of a fiber melting part due to splicing heating is stopped. Discharging time may be set to several seconds in a normal fusion splicing condition. When the axial shift and the angular deviation occurs between the holey fiber 1 and the supporting fiber 7, the deformation is generated in a splicing heating and melting zone D of the fusion-spliced part. Note that the fusion splicer has a highly accurate aligning function and therefore the connection loss can be reduced if the fusion splicing condition is optimized. However, the angular deviation between both fibers 1, 7 generated from the time of attaching the fiber holder 20, can not be solved. The deformation of the connection heating and melting zone D due to such an angular deviation, is an obstacle of inserting the optical fiber into a fiber guide hole in the connector ferrule for example. The deformation of the connection heating and melting zone D is a maximum reason for not utilizing the splicing heating and melting zone D, being the fusion spliced part, as a hole sealing part (hole closing part).

Next, as shown in FIG. 3D, the discharging electrodes 15, 15 are moved to a part of the holey fiber 1 away from the splicing heating and melting zone D, in the base end side direction (right side direction in FIG. 3D) of the holey fiber 1, and the holes 4 of the holey fiber 1 are made to disappear by discharge heating, so that the splicing heating and melting zone D is not melted again. Thus, in the holey fiber 1, a fiber heating and melting zone E, being a target hole disappearance region, is formed between the fixed part of the holey fiber 1 (fiber holder 20 positioned at the right side in FIG. 3D) and the splicing heating and melting zone D, being the fusion spliced part. Preferably, the fiber holder 20 attached with the holey fiber 1 is slightly moved to the side of the supporting fiber 7 (left side in FIG. 3D) at the second discharge heating, so that diameter reduction of a fiber heating and melting zone E is reduced and prevented.

Thereafter, as shown in FIG. 3E, in order to remove the splicing heating and melting zone D, being the fusion spliced part, the holey fiber 1 may be cut at a prescribed cut position C. Namely, the holey fiber 1 may be cut at a position between the splicing heating and melting zone D and the fiber heating and melting zone E, or at a position of the fiber heating and melting zone E.

A moving operation of the discharge electrodes 15, 15 of this embodiment is enabled by a commercially available fusion splicer with aligning function. The fusion splicer with aligning function has a function of so-called sweep discharge, and by using this function, the discharge electrodes 15, 15 are reciprocated after fusion splicing, so that heating processing can be performed. Further, the discharge heating operation of this embodiment can be automatically executed by the fusion splicer by slightly changing an operation program of the fusion splicer. Expansion of the hole disappearance region (fiber heating and melting zone E) can be easily realized by similarly changing the operation program, by heating the holey fiber 1 while shifting the discharge electrodes 15, 15, when the second holey fiber 1 is discharge-heated. The positional information of the resin coating edge of the resin coating part 5 is already known by the fusion splicer by providing the fiber stopper 22 in the fiber holder 20, and therefore a length from the resin coating edge to a center of the fiber heating and melting zone E can be accurately controlled. Further, in a commercially available optical fiber cutter, cut operation can be performed in a state that the fiber is fitted into the fusion splicer, and therefore a highly accurate cut position can be obtained.

Note that in the description of the first and second embodiments, explanation is given for a case that the electric discharge is used for heating the optical fiber. However, a carbon dioxide laser and a carbon heater can also be used as a heat source, other than the electric discharge. Further, the optical fiber end processing method of the present invention is capable of suppressing the increase in the loss while keeping high reliability, and can be applied not only to a single fiber but also to multi-fiber connectors and splices, and can contribute to various utilization hereafter, such as holey fiber and photonic crystal fiber having holes.

What is claimed is:

1. An optical fiber end processing method, for processing an end of an optical fiber comprising a core part; a clad part surrounding an outer periphery of the core part; and a plurality of holes formed along an axial direction of the core part around the core part in the clad part, the optical fiber end processing method comprising:
   an optical fiber fixing step of fixing two parts of the optical fiber;
   a first heating step of heating a tip end side part of the optical fiber between two fixed parts fixed in the optical fiber fixing step, melting the optical fiber of the tip end side heating part, and relaxing a stress of a non-melting part, after the optical fiber fixing step;
   a second heating step of heating a part on a base end side of the optical fiber between the two fixed parts away from the tip end side heating part in a state that the two fixed parts of the optical fiber are fixed, and making the holes of the optical fiber disappear, after the first heating step; and
   a removing step of removing from the optical fiber by cutting, the tip end side heating part after the second heating step.

2. The optical fiber end processing method according to claim 1, wherein in the second heating step, a length of a disappearance region of the holes is expanded by moving a heating position of the optical fiber.

3. The optical fiber end processing method according to claim 1, wherein a new end of the remaining optical fiber processed by the optical fiber end processing method of claim 1 is inserted into a ferrule and adhesion-fixed thereto, and thereafter an end face of the ferrule is polished, such that a disappearance region of the holes of the optical fiber end is positioned on the end face of the ferrule after polishing.

4. The optical fiber end processing method according to claim 1, wherein diameter reduction of a disappearance region of the holes is reduced or prevented by pushing the optical fiber in a direction of shortening a length of the optical fiber, in the second heating step.

* * * * *